Patented Jan. 1, 1935

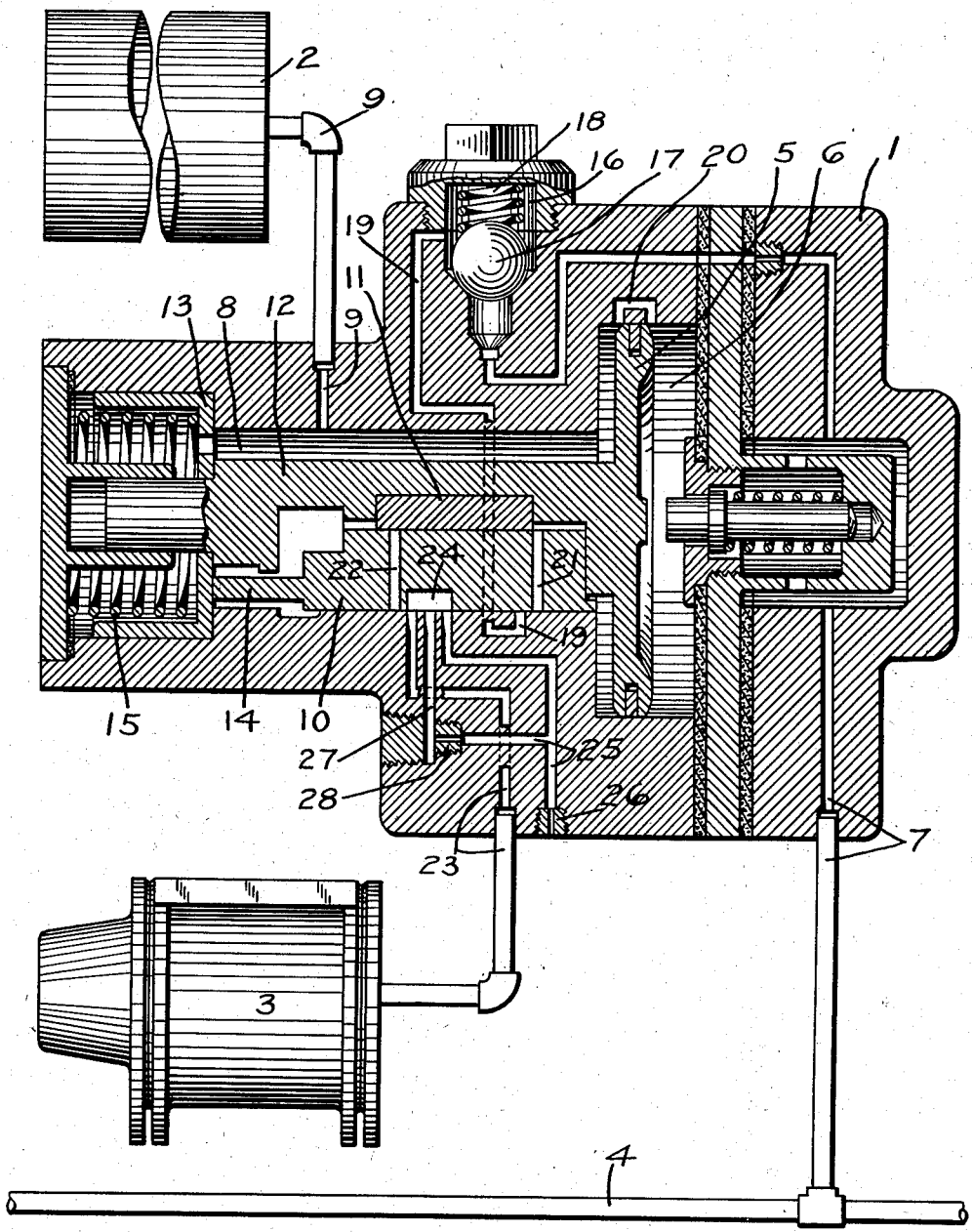

1,986,468

UNITED STATES PATENT OFFICE 1,986,468

FLUID PRESSURE BRAKE

Clyde C. Farmer, Pittsburgh, Pa., assignor to The Westinghouse Air Brake Company, Wilmerding, Pa., a corporation of Pennsylvania Application May 8, 1931, Serial No. 535,957

11 Claims. (Cl. 303—36)

This invention relates to fluid pressure brakes, and more particularly to an automatic fluid pressure brake system in which the brakes are applied upon effecting a reduction in brake pipe pressure and are released upon effecting an increase in brake pipe pressure.

On trains, especially long trains, there is danger that excessive and damaging shocks may be caused when the brakes are applied, due to the fact that the brakes are applied on the cars at the front end of the train before they are applied on the cars at the rear end of the train, so that the train slack is permitted to run in harshly and thus cause shocks.

The principal object of my invention is to provide means whereby the brakes on the cars at the head end of the train will be applied with less power than the brakes on the cars at the rear end of the train, so that the cars at the front end of the train tend to maintain the train slack stretched out and thus effectively prevent excessive and damaging shocks due to the running in of slack.

This object I accomplish by maintaining the auxiliary reservoirs on the cars at the head end of the train at a lower pressure than those on the cars at the rear end of the train, so that when an application of the brakes is effected the brake cylinder pressure on the cars at the head end of the train will be lower than the brake cylinder pressure on the cars at the rear end of the train.

In the accompanying drawing, the single figure is a diagrammatic view, mainly in section, of a fluid pressure brake equipment embodying my invention.

The equipment may comprise a triple valve device 1, an auxiliary reservoir 2, a brake cylinder 3 and a brake pipe 4.

The triple valve device 1 may comprise a casing containing a piston 5 having a chamber 6 at one side connected to the brake pipe through a passage and pipe 7 and having a chamber 8 at the other side connected to the auxiliary reservoir 2 through a passage and pipe 9. Contained in the chamber 8 is a main slide valve 10 and a graduating slide valve 11, both of which valves are adapted to be operated by the piston 5 through the medium of a stem 12.

The triple valve device is of the retarded release type, and consequently is provided with a retarded release stop 13, which is adapted to engage the rear end of the piston stem 12 and is also adapted to engage a lug 14 projecting rearwardly from the main slide valve 10. Movement of the stop 13 by the piston stem 12 is opposed by the action of a coil spring 15.

Contained in a chamber 16 in the triple valve casing is a ball valve 17, which is urged to its seat by the pressure of a coil spring 18. The brake pipe passage 7 leads to the under side of the ball valve 17 and a passage 19 leads from the chamber 16 to the seat for the main slide valve 10. The pressure of the spring 18 is such that the brake pipe pressure must be increased to a predetermined amount above auxiliary reservoir pressure, say for instance to five pounds, before the ball valve 17 is raised from its seat.

In charging the equipment, fluid under pressure supplied to the brake pipe 4 flows to the triple valve piston chamber 6 of the triple valve device on each car. On the cars at the head end of a train where the increase in brake pipe pressure is rapid, the triple valve pistons 5 and associated slide valves 10 and 11 will be shifted to their extreme inner or retarded release position against the opposing pressure of the spring-pressed stops 13. On the cars at the rear end of the train, where the increase in brake pipe pressure is slower, the triple valve parts will not be moved inwardly beyond full release position, as shown in the drawing.

With the triple valve parts in full release position, as shown in the drawing, fluid under pressure supplied to the brake pipe flows through the pipe and passage 7 to the piston chamber 6 and from thence to the auxiliary reservoir 2 through a feed passage 20 around the piston 5, valve chamber 8, and passage and pipe 9.

With the triple valve parts in retarded release position, the piston 5 closes the feed passage 20 and a port 21 in the main slide valve 10 registers with the passage 19. Now when the brake pipe pressure, acting on the under side of the ball valve 17 is sufficient to overcome the opposing pressure of the spring 18, the ball valve will be unseated and fluid under pressure will flow from the brake pipe passage 7 to the auxiliary reservoir 2 by way of passage 19, port 21 in the main slide valve 10, valve chamber 8 and passage and pipe 9. When the auxiliary reservoir is thus charged to a predetermined pressure, say for instance to within five pounds of the normal brake pipe pressure, the spring 18 acts to seat the ball valve 17, thus closing off the further flow of fluid from the brake pipe to the auxiliary reservoir. The pressure of fluid in the piston chamber 6 is sufficient to maintain the piston 5 and slide valves 10 and 11 in retarded release position against the combined pressure of the spring 15 and the pressure of fluid in the valve chamber 8.

It will thus be seen that on the cars at the rear end of the train the auxiliary reservoirs will be charged to the normal brake pipe pressure and that on the cars at the head end of the train the auxiliary reservoirs will be charged to a pressure below that of the brake pipe.

To effect an application of the brakes, the brake pipe pressure is reduced in the usual manner. Upon effecting a reduction in brake pipe pressure, each triple valve piston 5 moves outwardly to its extreme right hand or application position, first shifting the graduating slide valve 11 relative to the main slide valve so as to close the port 21 in the main slide valve and uncover a service port 22 in the main slide valve and then shifts the main slide valve to application position, in which fluid under pressure flows from the auxiliary reservoir to the brake cylinder through pipe and passage 9, valve chamber 8, service port 22 in the main slide valve 10 and a passage and pipe 23.

On the cars at the rear end of the train where the auxiliary reservoirs are charged to the normal brake pipe pressure, the brakes are applied with greater force than are the brakes on the cars at the head end of the train where the auxiliary reservoir pressure is lower than the normal brake pipe pressure. When the application of the brakes is thus effected, the cars at the front end of the train, where the braking force is not so great as that on the cars at the rear end of the train, tend to maintain the train slack stretched out and thus eliminate or reduce to a minimum shock incident to the running in of the train slack.

To release the brakes, the bake pipe pressure is increased in the usual manner, which causes the triple valve devices 1 at the head end of the train to move to retarded release position and the triple valve devices 1 at the rear end of the train to move to full release position. With the triple valve devices in these positions, the auxiliary reservoirs will be recharged with fluid under pressure in the same manner as before described.

With the triple valve device 1 in full release position, fluid under pressure is released from the brake cylinder 3 through pipe and passage 23, a cavity 24 in the main slide valve 10, a passage 25 and a choke plug 26. With the triple valve device in retarded release position, the main valve 10 covers the passage 25 at the seat of the slide valve, so that fluid under pressure is released from the brake cylinder by way of pipe and passage 23, cavity 24 in the main slide valve 10, a passage 27, a choke plug 28, passage 25 and choke plug 26.

It will be noted that by holding back the charging of the auxiliary reservoirs on the cars at the head end of the train until the brake pipe pressure has been increased to a predetermined degree higher than the pressure in said reservoirs, the brake pipe pressure will be more rapidly increased toward the rear end of the train than if the reservoirs at the head end of the train were supplied with fluid under pressure immediately upon an increase in brake pipe pressure, which results in the shortening of the period of time required to release the brakes.

From the foregoing description it will be understood that I have provided a fluid pressure brake equipment which, when embodied in the cars of a train, is operative upon the effecting of a reduction in brake pipe pressure, to effect an application of the brakes with greater force on the cars at the rear end of the train than on the cars at the head end of the train so as to prevent the harsh running in of the train slack.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure to either a full release position or a retarded release position for supplying fluid under pressure to said reservoir, and means for preventing said reservoir from being charged to a pressure equal to the normal brake pipe pressure after the brake controlling valve device has been moved to its retarded release position.

2. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure and operated upon a more rapid increase in brake pipe pressure for establishing another communication through which fluid under pressure is supplied to said reservoir, and means for preventing said reservoir from being charged to a pressure equal to the normal brake pipe pressure after the brake controlling valve device has been moved to establish said other communication.

3. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure and operated upon a more rapid increase in brake pipe pressure for establishing another communication through which fluid under pressure is supplied to said reservoir, and means operative automatically for closing off the flow of fluid through the last mentioned communication to prevent said reservoir from being fully charged after the brake controlling valve device has been moved to establish the last mentioned communication.

4. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure from the brake pipe, and operated upon a more rapid increase in brake pipe pressure for establishing another communication through which fluid under pressure is supplied from the brake pipe to said reservoir, and means for preventing said reservoir from being fully charged after the brake controlling valve device has been moved to establish the last mentioned communication.

5. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure from the brake pipe, and operated upon a more rapid increase in brake pipe pressure for establishing another communication through which fluid under pressure is supplied from the brake pipe to said reservoir, and means for delaying the supplying of fluid under pressure from the brake pipe to said reservoir through the last mentioned communication until a predetermined increase in brake pipe pressure has been effected and for limiting the supply of fluid to said reservoir through the last mentioned communication, said brake controlling valve device being maintained in position to establish the last mentioned communication until a subsequent application of the brakes is initiated.

6. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure and operated upon a more rapid increase in brake pipe pressure for establishing another communication through which fluid under pressure is supplied to said reservoir, and means operative to close off the flow of fluid under pressure to said reservoir through the last mentioned communication when the reservoir is charged to a predetermined pressure, and means for preventing the pressure of fluid in the reservoir from being increased after the flow of fluid through the last mentioned communication is closed off.

7. In a fluid pressure brake equipment, the combination with a brake pipe, a brake cylinder and an auxiliary reservoir from which fluid under pressure is adapted to be supplied to the brake cylinder to effect an application of the brakes, of a brake controlling valve device operated upon a reduction in brake pipe pressure to supply fluid under pressure from said reservoir to the brake cylinder and operated to one position upon an increase in brake pipe pressure at a certain rate to release fluid under pressure from the brake cylinder and to supply fluid under pressure to said reservoir and operated to another position upon an increase in brake pipe pressure at a more rapid rate to release fluid under pressure from the brake cylinder and to supply fluid under pressure to said reservoir, and means operative when the brake controlling valve device is in said other position for limiting the supply of fluid under pressure to said reservoir, said brake controlling valve device being maintained in the last mentioned position until a subsequent application of the brakes is initiated.

8. In a fluid pressure brake equipment, the combination with a brake pipe, a brake cylinder and an auxiliary reservoir, of a triple valve device operated upon a reduction in brake pipe pressure for supplying fluid under pressure from said reservoir to the brake cylinder and operated to one position upon an increase in brake pipe pressure at a certain rate for releasing fluid under pressure from the brake cylinder and for supplying fluid under pressure from the brake pipe to said reservoir and operated to another position upon an increase in brake pipe pressure at a more rapid rate for releasing fluid under pressure from the brake cylinder and for supplying fluid under pressure from the brake pipe to said reservoir, and a valve operative when the triple valve device is in said other position for limiting the supply of fluid under pressure to said reservoir, said triple valve device being maintained in the last mentioned position by fluid at brake pipe pressure until a subsequent application of the brakes is initiated.

9. In a fluid pressure brake equipment, the combination with a brake pipe, a brake cylinder and a reservoir from which fluid under pressure is adapted to be supplied to the brake cylinder to effect an application of the brakes, of brake controlling valve means subject to the opposing pressures of the brake pipe and said reservoir and operative upon a reduction in brake pipe pressure for supplying fluid under pressure from the reservoir to the brake cylinder to effect an application of the brakes and operative upon an increase in brake pipe pressure to either an outer release position or an inner release position for releasing fluid under pressure from the brake cylinder and for supplying fluid under pressure to said reservoir, means opposing movement of the brake controlling valve means to said inner release position, and means operative in the inner release position of the brake controlling valve device for closing off the supply of fluid to said reservoir before the combined pressures of the opposing means and fluid in said reservoir exceeds the pressure of fluid in the brake pipe.

10. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure from the brake pipe, and operated upon a more rapid increase in brake pipe pressure for closing said communication and for establishing another communication through which fluid under pressure is supplied from the brake pipe to said reservoir, yieldable means opposing movement of the brake controlling valve means to establish said other communication, and means for closing off the flow of fluid to the reservoir through said other communication before the combined pressures of the reservoir and yieldable means is sufficient to move said brake controlling valve means to establish the first mentioned communication.

11. In a fluid pressure brake equipment, the combination with a brake pipe, a brake cylinder and a reservoir from which fluid under pressure is adapted to be supplied to the brake cylinder to effect an application of the brakes, of a brake controlling valve device operated upon an increase in brake pipe pressure at a certain rate to establish communication through which said reservoir is fully charged with fluid under pressure from the brake pipe, and operated upon a more rapid increase in brake pipe pressure for closing said communication and for establishing another communication through which fluid under pressure is supplied from the brake pipe to said reservoir, yieldable means opposing movement of the brake controlling valve means to establish said other communication, and means for closing off the flow of fluid to said reservoir through said other communication before the combined pressures of the reservoir and said yieldable means exceeds brake pipe pressure.

CLYDE C. FARMER.